Figure 1B:
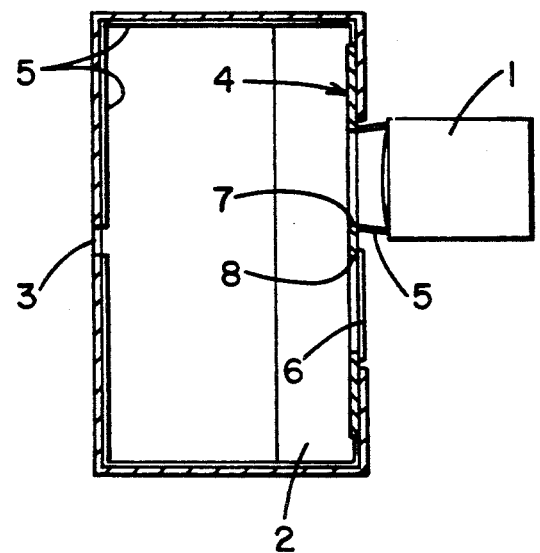

United States Patent [19]

Laihanen

[11] Patent Number: 5,157,464
[45] Date of Patent: Oct. 20, 1992

[54] APPARATUS FOR VIEWING

[75] Inventor: Pekka Laihanen, Helsinki, Finland

[73] Assignee: Teknillisen Korkeakoulun Graafisen Tekniikan Laboratorio, Tekniikantie, Finland

[21] Appl. No.: 603,688

[22] PCT Filed: May 8, 1989

[86] PCT No.: PCT/FI89/00084
§ 371 Date: Nov. 6, 1990
§ 102(e) Date: Nov. 6, 1990

[87] PCT Pub. No.: WO89/11086
PCT Pub. Date: Nov. 16, 1989

[30] Foreign Application Priority Data

May 6, 1988 [FI] Finland ................................ 882118

[51] Int. Cl.$^5$ .................................................. G01J 3/46
[52] U.S. Cl. ...................................... 356/402; 356/425
[58] Field of Search .................. 356/71, 388, 389, 391, 356/392, 394, 402, 425; 358/10, 80

[56] References Cited

U.S. PATENT DOCUMENTS

| | | | |
|---|---|---|---|
| 2,873,310 | 2/1959 | Valensi | 358/10 |
| 3,632,217 | 1/1972 | Bartleson | 356/405 |
| 4,029,418 | 6/1977 | Cottingham et al. | 356/394 |
| 5,033,857 | 7/1991 | Kubota et al. | 356/402 |

FOREIGN PATENT DOCUMENTS 22523  1/1990  Japan .................................. 356/425

OTHER PUBLICATIONS

Lang et al., *SMPTE Journal*, vol. 87, Sep. 1978, pp. 579–582.

*Primary Examiner*—F. L. Evans
*Attorney, Agent, or Firm*—Woodling, Krost & Rust

[57] ABSTRACT

The invention applies a viewing system used for reproduction or proofing based on the colorimetric analysis, the characteristics of which are based on the fact that the external conditions affecting the visual color impression of the screen image or other non-reflecting image and of the reflecting image the same. Furthermore, as all the colors in the images have the same chromaticity and luminance, the internal charcteristics of the images do not distort the total color impression, either. In the viewing system the screen or other non-reflecting image (1) is placed behind a uniformly illuminated, usually medium gray, viewing plane (4). The viewing plane is provided with an opening of the same size and shape as the reflecting image, through which viewer sees a part of the screen or other non-reflecting image, and another opening for the reflecting image (6).

10 Claims, 3 Drawing Sheets

APPARATUS FOR VIEWING

The object of the invention is a viewing system which can be used for comparing reproduced and proof images, or for studying a non-reflecting image alone. Generally, it is advisable to use a colour definition method based on colorimetry in all applications of the technique in which the colours should be described unambiguously and precisely. The colorimetric method has been used and is still used in certain (not so many) colour reproduction equipment applications. Generally taken, this subject has been studied relatively little. As for commercial applications, the principles have not made a breakthrough into the printing trade. One reason for this is the lack of accurate and usable information on the factors affecting the perception of colours and the reproduction of colours in the reproduction process.

Numerous factors connected with the surroundings of the image and the image itself affect the colour effect given by the image, so there is no accurate quantitative method for describing how the colour effect appears. Many reproduction and proofing methods based on colorimetric colour analysis, some of which have been refined over the years, do not give satisfactory results, since the visual colour effect and its repeatability cannot be controlled. Even if these methods would give satisfactory results in practical use, the quantification of the colour effect and controlling its repeatability usually present a major problem.

Using the now-invented viewing system it has been possible to solve the above-mentioned problem in a limited scope with digital definition of the colour effect. This is based on the fact that when using the viewing system, different types of images will give a similar visual effect, provided the chromaticity defined with the colorimetric method, and the absolute luminance are the same for each colour in the images to be compared.

The now-invented system consists of a box, a viewing plane on the rear wall of the box, an opening in the viewing plane for the reflecting and non-reflecting image, equipment for illuminating the viewing plane and the reflecting image, and in the front wall of the box, a viewing opening. The box is ideally lined with a material reflecting as little light as possible. The light should ideally simulate daylight. The illumination system is such that no light is projected onto the non-reflecting image. This can be achieved e.g. by placing the non-reflecting picture behind the viewing plane. Ideally, the viewing plane and the images to be viewed are parallel to each other. The viewing opening is ideally placed symmetrically with reference to the images. The size and shape of the image openings depend on the size and shape of the images to be viewed. Moreover, the edges of the openings are preferably lined with material reflecting as little light as possible.

The viewing plane is usually medium grey, but it can be lined for example with the printing paper to be used.

When the non-reflecting image is behind the viewing plane, the edges of the opening in the viewing plane, and the duct between the opening and the image surface, are coated with a material (e.g. black) reflecting as little light as possible. The person viewing the image will see the lining of the interior walls, as the image is confined to the viewing plane surface.

The reflecting image can essentially be placed on viewing plane (whereby the distance between the image and the plane can, for example, be equal to the thickness of the paper with which the plane is lined).

Both the reflecting image and the non-reflecting image can be placed behind the plane, preferably at the same distance.

Both the viewing plane and the reflecting image can be illuminated with same lighting fixtures. There can, for example, be two lighting fixtures placed on opposite sides of the viewing plane, or for example four or more lighting fixtures placed of various sides of the viewing plane.

There can also be separate lighting fixtures for the viewing plane and the reflecting image. In this case, the viewing plane is a semi-translucent diffuse surface illuminated from behind. The reflective image can be illuminated from the front so that the light falls only on the reflecting image.

Figure 1C:
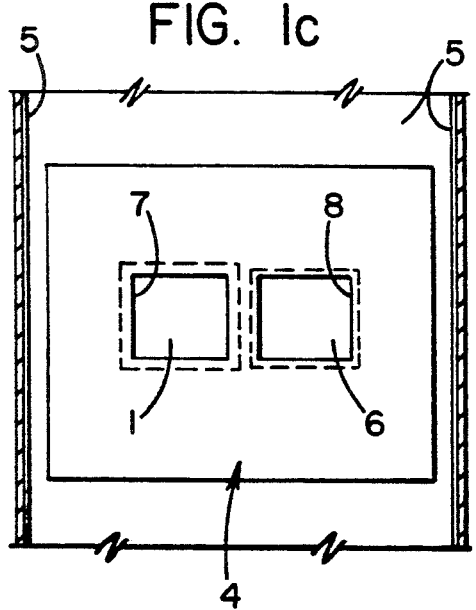
Figure 1A:
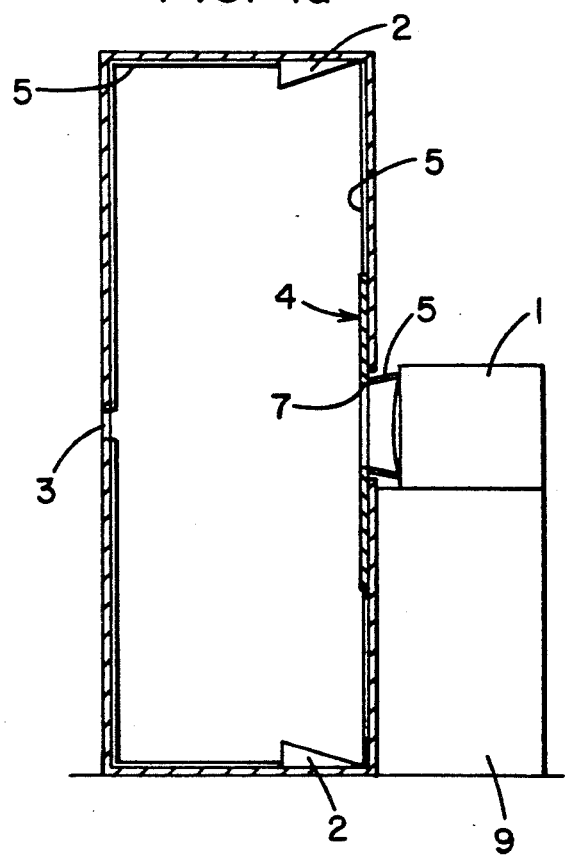
Figure 2B:
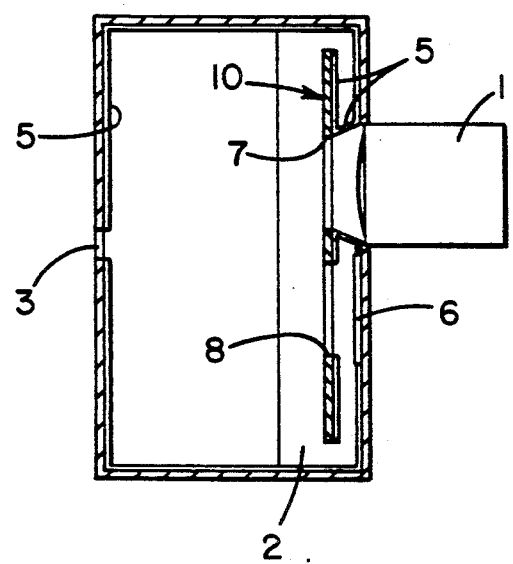
Figure 2A:
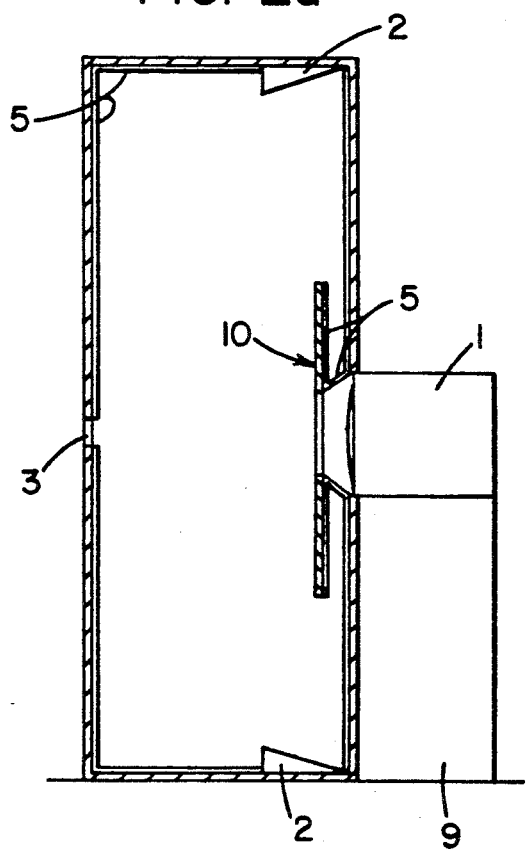
Figure 2C:
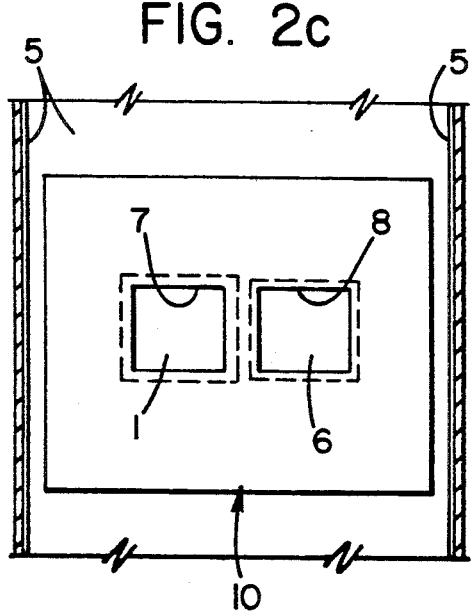

Some modifications of the invention are described in detail with reference to the attached drawings, whereby FIGS. 1a and 1b are a schematic view of the now-invented viewing system, as seen from the side and above; FIG. 1c shows the viewing plane as seen from the front; and FIGS. 2a, 2b, 2c as well as 3a, 3b and 3c display two more now-invented systems as seen from the same angles.

The viewing system in question was developed for use with the reproduction method based on colorimetric colour analysis. However, the system can be used in principle with any colour separation equipment. Using a test run and the method described—e.g. in the article Laihanen, P. Colour Reproduction Theory Based On The Principles Of Colour Science. IARIGAI, 19th International Research Conference. May 31 - Jun. 6, 1987, Eisenstadt (the said article is attached hereto)–it is possible to define for any standardized reproduction process the interdependence of the colours used (e.g. cyan C, magenta M, yellow Y, black K) and the colorimetric colour values. If the (digitalized) CMYK values of the image colour separated with the appropriate reproduction process are known, it is possible to calculate the colorimetric colour value and, furthermore, the image colour parameters of a screen or other non-reflecting image that give the appropriate colour as defined with the colorimetric analysis. In this way it is possible to obtain a "soft proof" with a reproduction method which does not apply the principles of the colorimetric colour analysis. If the screen or other non-reflecting image can reproduce all the colours of the reflecting image, an accurate proof can be made of any image, when its colorimetric colour values in conditions similar to those in the viewing system displayed in the figures are known, or they can be calculated using the method described in the before-mentioned article or some other method. To facilitate the computation of the colour values, the chromaticity and the luminance of the light reflected from the reference white on the viewing plane (e.g. pressed barium sulphate powder) should be standardized, whereby it is in principle possible to make the required colour measurements and computations without the viewing system. The non-reflecting image refers to either to a self-illuminating image based on the colour additive method, such as the CRT, or a translucent image provided with its own light source.

The figures show equipment in which, when viewing the colour screen or other non-reflecting image and the reflecting image, the colours are visually similar to each other, provided the chromaticity defined with the colorimetric method (e.g. the CIE x and y values) and the luminance are the same for all the colours in the image. The visual equivalence has been experimentally proven. In particular, it should be noted that lightness is expressed as absolute luminance value (cd/m$^2$) and not as relative lightness.

As shown in FIGS. 1 and 2, the colour screen or other non-reflecting image 1 is placed behind the usually medium grey viewing plane 4 or respectively 10, which is illuminated with the lamps simulating natural daylight. Medium grey may be replaced with some other colour. In some cases, the viewing plane may, for example, be lined with the paper used for printing. In the viewing plane is the opening 7, usually square or rectangular, and of the size and shape of the reflecting image, through which the person looking into the system sees a part of the screen or other non-reflecting image. The viewing plane is also provided with the opening 8 for the reflecting image 6. Viewing of different-sized pictures is also possible. Normally, openings of various sizes or digital image format conversion should be used to give images of equivalent size. The viewing system is so designed that no light from the lamps illuminating the reflecting image and the viewing plane falls on the screen or on another, non-reflecting image. Moreover, to avoid distracting reflections, the frame and the edges of the area between the viewing plane and non-reflecting image surface are lined with a material 5, such as black velvet, reflecting as little light as possible. To ensure visual equivalence, the reflecting image is also placed behind the viewing plane.

In the system shown in FIG. 1, the distance between the image surface and the viewing plane 4 is very small (e.g. the thickness of the sheet of paper on the viewing plane), so that there is no change in the light falling on the image surface, except in microscale along the edges. The other alternative is to place the screen or other non-reflecting image and the reflecting image at an equal distance from the viewing plane, as shown in FIG. 2.

Placed symmetrically in respect of the images at a suitable distance from the viewing plane, the images are viewed through the opening 3. The viewer will not see the edges of the screen or other non-reflecting image, nor the black lining of the opening, as the images are confined to the uniformly illuminated viewing plane surface.

The characteristics of the viewing system are based on the fact that the conditions affecting the visual colour impression given by the screen or other non-reflecting image and the reflecting image are the same. And since the chromaticity and luminance of all the image colours are the same, the internal factors of the image will not cause any differences in the total colour impression, either.

Figure 3B:
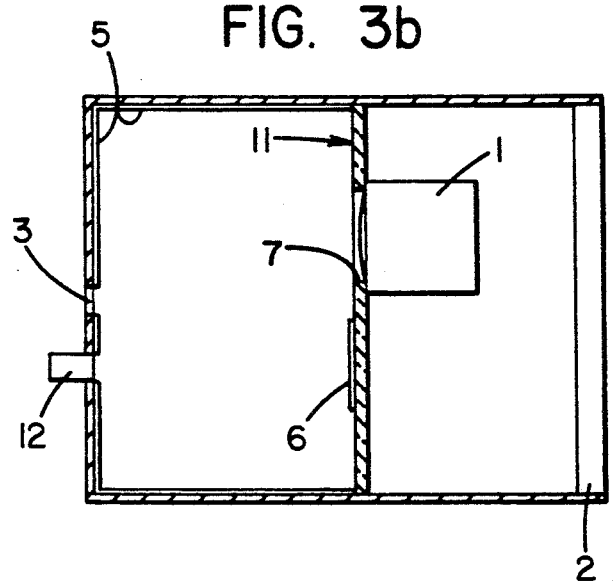
Figure 3A:
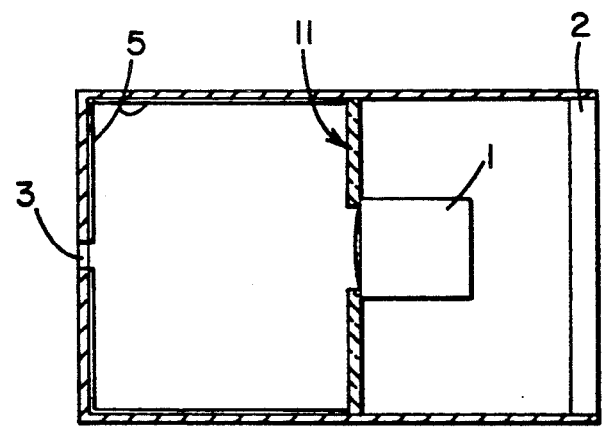
Figure 3C:
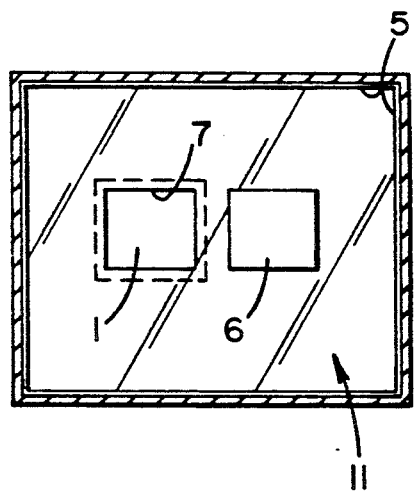

In the viewing system shown in FIG. 3 the diffuse translucent viewing plane 11 is backlit with the lighting fixture 2. The reflecting picture 6 is illuminated frontally with the spotlight 12. The spotlight 12 only illuminates the part of viewing plane 11 covered by the reflecting image 6. The viewing plane 11 is provided with the opening 7 for the screen 1. The images are viewed through the opening 3. The inner walls 5 of the construction are made of a material reflecting as little light as possible.

The basic principle with the system as shown in FIG. 3 is to achieve (as in FIGS. 1 and 2) a uniform viewing environment for the image on the screen and the reflecting image.

The viewing system is well suited for comparing the screen image or other non-reflecting image and a reflecting image. However, in the early stages of reproduction there is (of course) no reproduced image available. In such a case, the screen image or other non-reflecting image is viewed on its own. Thus it is possible to the use the screen image or other self-illuminating image both as a tool for interactive image processing and as a high quality "soft proof".

I claim:

1. A system for viewing a reflecting and/or a non-reflecting image, to be used for reproduction or proofing based on colorimetric analysis, comprising:
   a box with a rear wall and a front wall;
   a viewing plane on the rear wall of the box;
   a first opening in the viewing plane for a reflecting image;
   a second opening in the viewing plane for a non-reflecting image; means for uniformly illuminating the viewing plane and the reflecting image visible through the first opening in the viewing plane without illuminating the surface of the non-reflecting image visible through the second opening in the viewing plane;
   a viewing opening in the front wall of the box through which the reflecting image and the non-reflecting image can be viewed simultaneously.

2. A viewing system as set forth in claim 1, in which the non-reflecting image is essentially placed behind the viewing plane.

3. A viewing system as set forth in claim 1, in which the reflecting image is essentially placed behind the viewing plane.

4. A viewing system as set forth in claim 1, in which the reflecting image and the non-reflecting image are placed at substantially the same distance behind the viewing plane.

5. A viewing system as set forth in claim 1, in which the means for illuminating consists of light sources which illuminate both the reflecting image and the viewing plane.

6. A viewing system as set forth in claim 1, in which the means for illuminating comprises separate light sources for illuminating the reflecting image and for illuminating the viewing plane.

7. A viewing system as set forth in claim 1, in which the viewing plane is a semitranslucent, diffuse plane illuminated from behind.

8. A viewing system as set forth in claim 1, in which the viewing plane has a medium grey surface.

9. A viewing system as set forth in claim 1, in which the viewing plane has a surface which is lined with a printing paper.

10. A viewing system as set forth in claim 1, in which both the size and the shape of the first and second openings for the reflecting image and the non-reflecting image can be adjusted according to the size and the shape of the image to be viewed.

* * * * *